Aug. 22, 1967     L. E. REYNOLDS     3,336,796
APPARATUS AND METHOD OF DETERMINING AMOUNT OF PICKUP OF
COATING BY A PREDETERMINED LENGTH OF MOVING SUBSTRATE
Filed July 24, 1964     2 Sheets-Sheet 1
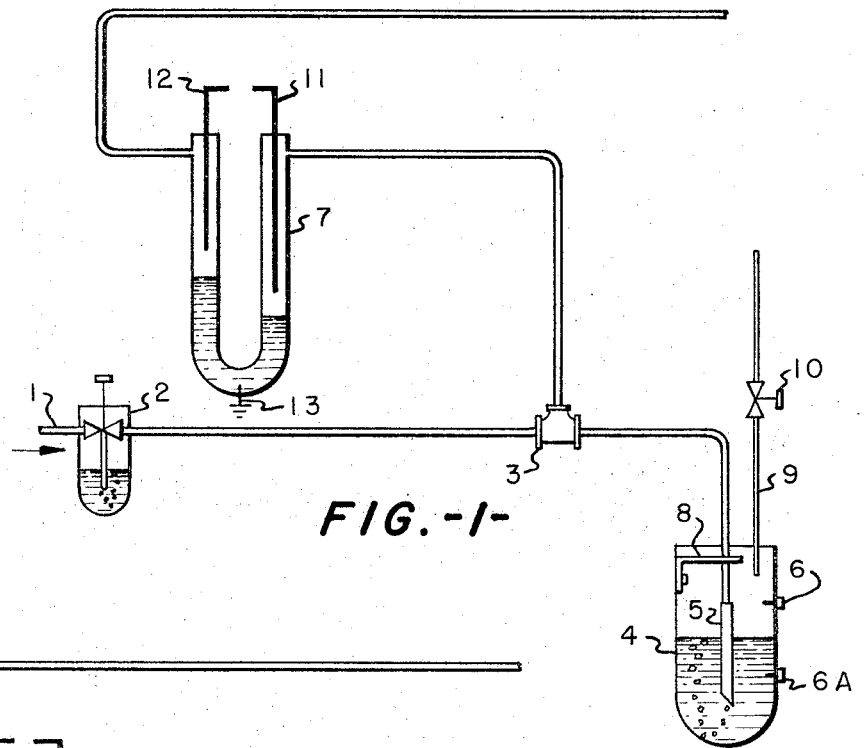
FIG.-1-
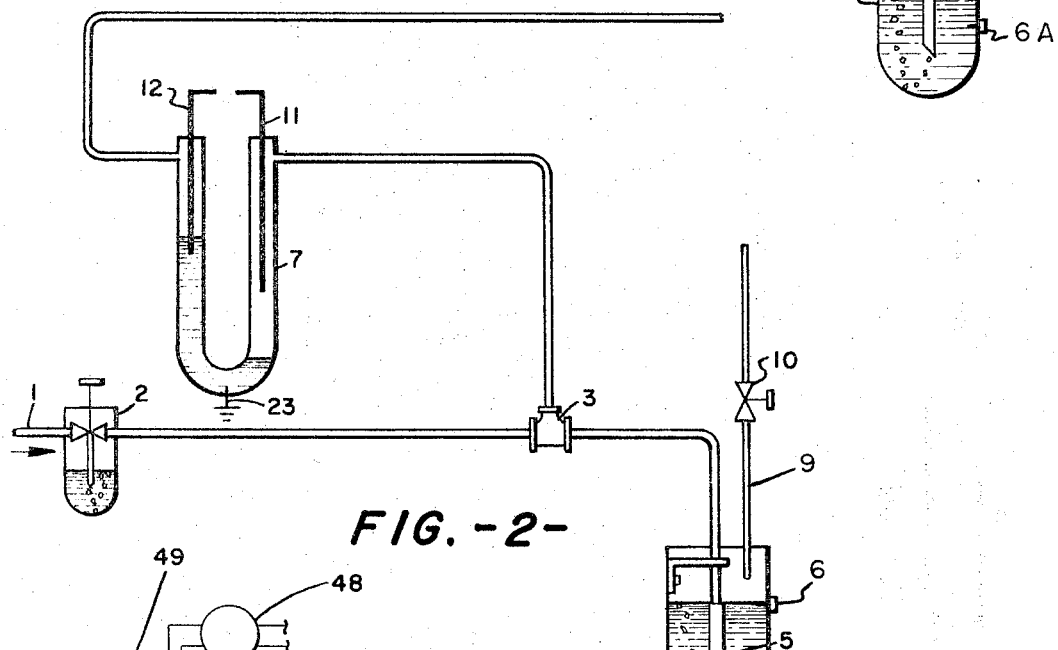
FIG.-2-
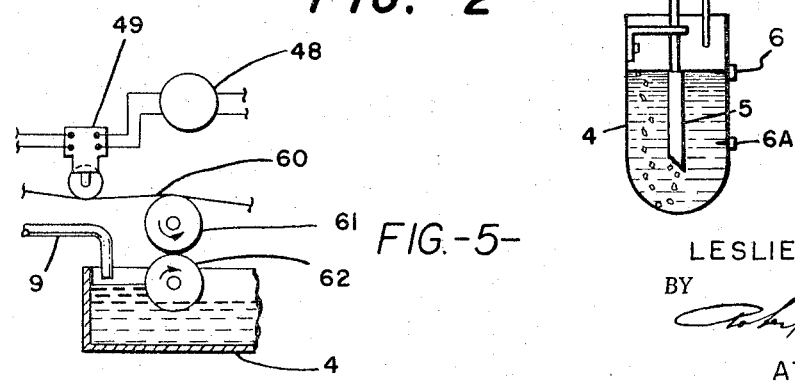
FIG.-5-
INVENTOR.
LESLIE E. REYNOLDS
BY
ATTORNEY

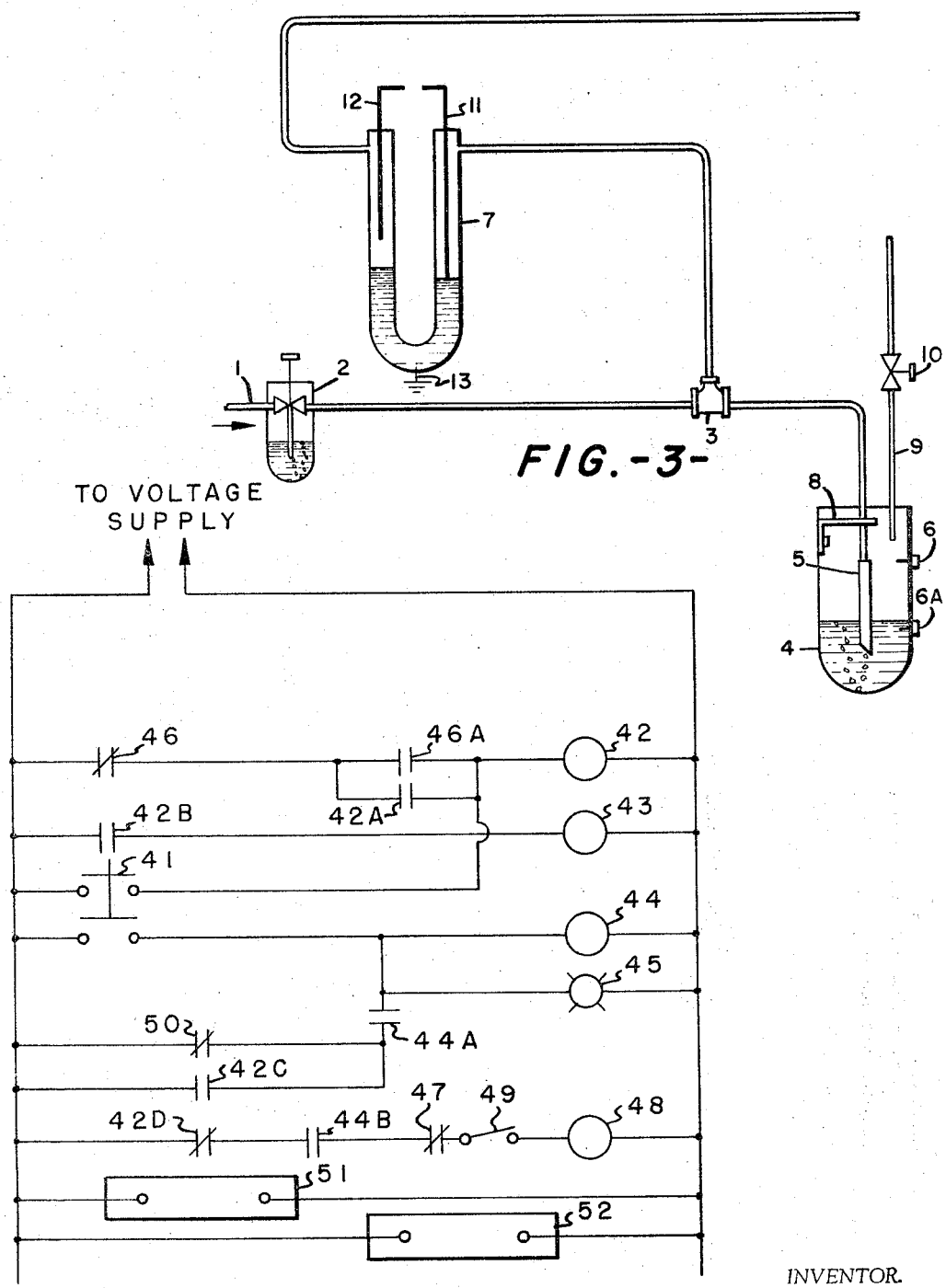

United States Patent Office 3,336,796
Patented Aug. 22, 1967

3,336,796
APPARATUS AND METHOD OF DETERMINING AMOUNT OF PICKUP OF COATING BY A PREDETERMINED LENGTH OF MOVING SUBSTRATE
Leslie E. Reynolds, Greenville, S.C., assignor to Deering Milliken Research Corporation, Spartanburg, S.C., a corporation of Delaware
Filed July 24, 1964, Ser. No. 384,981
7 Claims. (Cl. 73—150)

This invention relates to the rapid evaluation of pickup of coating compositions on a moving substrate.

Determination of pickup of coating compositions on substrates and particularly fabric substrates during processing operations is commonly carried out by cutting sample swatches from a fabric and then determining the increase in weight per unit volume of fabric. This procedure is, of course, not only time consuming in itself, but the resultant time lag between the weighing of the fabric and the continuous processing of the fabric prevents rapid adjustments from being made to compensate for any deficiencies in the process which are revealed by the fabric analysis. While liquid levels in tanks employed in coating operations such, as for instance, pad baths are commonly controlled by a continuous level sensing and regulating device, no acceptable low cost analyzing devices which will give data sufficiently rapid for continuous operations have heretofore been available for use therewith in the determination of pickup of a coating composition upon a moving substrate. Devices such as instruments which rely upon the measurement of absorption of beta ray bombardments will provide accurate readings but the cost of such instruments are prohibitive. The reasons for the lack of a low cost device are probably the numerous variables which are present in the substrate itself, variations in the coating medium and variations in mechanical operations applied to the substrate prior to, during or subsequent to contact with the coating medium.

It is therefore an object of this invention to provide a method for the rapid determination of pickup of coating material upon a moving substrate.

It is another object of this invention to provide an apparatus for the rapid determination of the pickup of coating material upon a moving substrate.

It is still another object of this invention to provide an apparatus suitable for use in conjunction with a pad pan liquid level control device for determining the pickup of coating material upon a moving substrate.

In accordance with this invention it has now been discovered that pickup of a coating composition upon a moving substrate may be determined by measuring changes in pressure associated with a change in volume or liquid level of a coating composition in a pad pan and counting the number of yards of substrate being processed during the pressure change. While numerous devices may be employed for measuring the change in pressure such as, for instance, pressure switches employing any of a wide variety of pressure responsive elements, it is preferred that the pressure change be determined by means of a manometer, a manometer being a basic device which is suitable for precisely measuring liquid level and especially liquid level associated with pressure changes. More specifically, the pressure change which is measured is that pressure which is required to bubble air from a fixed position into the varying levels of coating composition contained within a pad pan. The manometer is preferably a manometer equipped with electric probes, the contact of which with the fluid within the manometer stopping and starting a substrate count. The amount of chemical in a pad pan which must be removed to change the manometer level from one manometer probe to the other manometer probe must be accurately calibrated.

The pressure measurement involved in this invention employs a proven hydrostatic balance principle. The principle may be simply explained by considering an open-ended dip tube which is submerged into a tank of fluid. The height of fluid in the tube will seek a level equal to the height of fluid in the tank. If a pressure were applied to the tube the level in the tube would be depressed and, were the pressure sufficient, the level could be depressed until all fluid were driven from the tube and the excess pressure would bubble out the open submerged end of the tube. The amount of pressure required to displace the fluid is exactly the same as the linear height of fluid displaced. A measurement is made of this pressure by means of a manometer which has one leg open to the atmosphere and the other leg coupled to the air supply line which is bubbling air through the tube immersed in the coating composition contained in the tank.

The coating composition level of the tank or pad pan is preferably controlled by means of high level probe and low level probe which are in circuit with an automatic feed valve, the automatic feed valve opening when the liquid level drops to the low probe and the automatic feed valve closing when the filling operation raises the liquid level to the high probe. As the coating composition liquid level drops, the manometer pressure drops accordingly. Electrical probes are disposed within the manometer and when the manometer fluid leaves the upper manometer electrical probe as a result of pressure drop, the yardage counter on the moving substrate is started. When the manometer fluid touches the lower manometer probe, the yardage counter is stopped. The pressure change represented by the distance between the manometer electrical probes represents a constant number of pounds $p$ applied to a passing substrate during the counting cycle. The pickup of coating composition upon a substrate may then be determined by letting $d$ equal the dry weight per yard of substrate prior to application of coating composition and letting $y$ equal the yardage counting reading for the substrate. The percent pickup of coating composition is then equal to $100p \div yd$.

A better understanding of the invention may be had from the drawings which are as follows:

FIGURE 1 is a schematic view of a pad pan coating apparatus equipped with the air bubble probe and manometer measuring system of the invention, wherein the manometer fluid level and the pad pan liquid level are in one relationship.

FIGURE 2 is a schematic view of the apparatus of FIGURE 1 wherein the manometer fluid level and the pad pan liquid level are in another relationship.

FIGURE 3 is a schematic view of the apparatus of FIGURE 1 wherein the manometer fluid level and the pad pan liquid level are in still another relationship.

FIGURE 4 is a circuit diagram of the electrical system for the analytical device of this invention.

FIGURE 5 is a partially schematic view of the pad pan and the moving substrate.

Turning to FIGURE 1 of the drawings, an air supply line 1 is coupled to a needle valve and sight feed bubbler assembly 2. The properly controlled supply of air, that is to say a few bubbles per second, is then passed to a T-member 3. One section of the air supply line continuing from T-member 3 is passed into pad pan 4 where the air supply line terminates in the form of a bubbler tube 5. Bubbler tube 5 is secured in a fixed position by means of bracket member 8 so as to be below the lower of two probe members 6 and 6A which determine the liquid level within pad pan 4. The pad pan 4 is filled by means of filler pipe 9 which is equipped with a solenoid actuated valve member 10. The second line running from T-member 3 is connected to one leg of manometer 7. The other leg of manometer 7 is connected to an open air line which terminates just above pad pan 4 so as to insure the elimination of any atmospheric pressure variations which might otherwise effect the manometer reading. As previously explained the amount of pressure required to displace the fluid in bubbler tube 5 is a measurement of the height of the liquid in relation to the bottom of the bubble tube in the pad pan. A measurement is made of this pressure by manometer 7, the pressure measurement being translated into electrical conductivity whenever the manometer fluid is in contact with low manometer probe 11 and ground probe 13 or high manometer probe 12 and ground probe 13.

The manner in which the pressure measurement derived from the manometer is employed in the overall system for the determination of pickup of coating composition on moving substrates may be seen from a discussion of a padding operation. Assuming that at the start of the operation the pad pan level is as shown in FIGURE 1 of the drawings, that is to say the pad pan level in pad pan 4 is intermediate low pad pan probe member 6A and high pad pan probe member 6. The pressure from bubbler tube 5 will then cause the manometer fluid within manometer 7 to assume a position substantially as set forth in FIGURE 1, and more specifically a position which places the manometer fluid out of contact with both low manometer probe member 11 and high manometer probe member 12.

FIGURE 5 illustrates a conventional pad pan 4 in which substrate or material 60 proceeds over an application roll 61 which, in conventional manner, is supplied coating material from the pad pan 4 by a doctor or pickup roll 62. Yardage switch member 49 is shown in operative relation to the substrate 5 and actuates the counter 48 as hereinafter described.

In order to initiate an analytical determination, the circuit as set forth in FIGURE 4 of the drawings, is closed by pushing momentary contact switch 41 which pulls in relay member 42 and all associated relays 42A, 42B, 42C and 42D, thereby energizing solenoid 43 which opens solenoid actuated valve 10 and allows coating composition to flow into the pad pan through the filler pipe and valve arrangement. Relay member 42 is sealed in through high pad pan probe relay member 46 and relay contact member 42A. It should be understood that for ease of illustration, all relay contacts of FIGURE 4 are shown in the deenergized coil position. Both high pad pan probe relay member 46 and low pad pan probe relay member 46A are in the position corresponding to the conditions shown in FIGURE 1. Solenoid valve 43 is sealed into the circuit by relay member 42 through relay contact member 42B. The actuation of manometer start switch 41 also pulls in relay member 44 and associated relay contact members 44A and 44B thereby locking relay member 44 into the circuit through relay contact member 44A and relay contact 42C. A pilot light 45 will light indicating that the circuit is properly set for yardage count, when the pad pan liquid level is at the correct position as determined by manometer probe member 11 and 12 of FIGURE 1 of the drawing. When the pad pan liquid level reaches the point that high pan pan probe member 6 is contacted, a condition which is illustrated in FIGURE 2 of the drawings, contact 46 shown in FIGURE 4 of the drawings opens and relay member 42 will drop out of the circuit and solenoid valve 43 will deactuate preventing further liquid from entering the pad pan through valve member 10 of filler pipe 29. Electrical conduction is now established between high manometer probe member 12 and ground manometer probe 13 as may be seen in FIGURE 2 of the drawings. Returning to FIGURE 4 of the drawings and looking at FIGURE 2 it can be seen that the establishment of the circuit between the probe members 12 and 13 energizes a coil, not shown, to open the contact member 47. Counter member 48 which is in circuit with contact member 47 may be actuated only when relay members 42D and 44B are closed and contact member 47 is closed. Contact member 47 closes when the manometer fluid leaves the high manometer probe. When the previously mentioned conditions are met, yardage switch 49 closes one time for each yard of material passing through the pad pan. Material passing through the pad pan will cause the liquid level in the pad pan to fall and produce a corresponding change in the position of the fluid within the manometer. When the pad pan liquid falls to a position such that the manometer liquid leaves the upper manometer probe 12, as illustrated in FIGURE 1 of the drawing, electrical contact will be broken between upper manometer probe member 12 and ground probe member 13 and contact 47 will then close and counter 48 will register a count each time yardage switch member 49 closes. Counter 48 will continue to register yardage count until the liquid level in the pad pan is reduced to the point that the manometer fluid assumes the position illustrated in FIGURE 3 of the drawings. At this point as illustrated in FIGURE 3 of the drawing, electrical contact is established between low manometer probe 11 and ground manometer probe 13. Returning to FIGURE 4 of the drawing, the previously mentioned position of the manometer fluid will now cause contact member 50 to open. When contact member 50 opens, relay member 44 will drop out of the circuit causing relay contact member 44B to open and interrupt the electrical circuit to counter member 48. Relay contact 44A also opens and light member 45 will go out signalling that the count is complete. The level of the pad pan will now remain under the control of high pad pan probe members 6 and low pad pan probe member 6A which through suitable electrical connections control the position of high pad pan probe relay member 46 and low pad pan probe relay member 46A until another analytical event is initiated. Completing the circuit as illustrated in FIGURE 4 of the drawings are a lower manometer probe chassis 51 which controls relay contact member 50 by amplifying the minute current flow between the low manometer probe and the ground manometer probe when the two probes are contacted by manometer fluid and then actuating a relay member. Upper manometer probe chassis member 52 controls relay contact member 47 by suitable amplification of the electric current which flows between the high manometer probe and the ground manometer probe when the two probes are contacted by manometer fluid so as to actuate a relay controlling relay contact member 47.

It should be understood that for purposes of simplicity the apparatus of this invention has been set forth for semiautomatic operation, that is to say for intermittent actuation by an operator. If however a continuous system is desired it should be understood that a plurality of counters and preferably two electrical reset counters may be employed, and the circuit may be modified so that the counters are sequentially actuated and deactuated, that is to say, one of the counters will hold its count while a second counter takes control for an additional count. The counters in and out of use may be altered back and forth so as to provide a continuous fully automatic system for determining coating composition pickup.

The counter may be any of the wide variety of electrically actuated counters. It is preferred, however, that an electro magnet be employed. That is to say a counter consisting of an electro magnetic associated actuating armature and mechanical counting wheel system. Such a counter is operated by electrical impulses sent out by an impulse transmitter giving one impulse for each unit to be counted. The armature is attracted to the electro magnet when an impulse passes through the coil of the electro magnet and thus causes the first counter wheel to turn in most cases for half the total movement. The second half of the movement is produced by a spring which pulls the armature back. While the counters employed in this invention may be of either the manual reset or electrical reset, the electrical reset type is preferred where a fully automatic operation is desired. Electrical resetting may be accomplished by energizing a resetting coil contained within the counter.

The manometer employed in this invention may be any of a wide variety of manometers suitable for determining pressures produced by the passage of a stream of air through a bubble tube. U type manometers have been found to be quite satisfactory for this purpose and especially U type manometers having one leg open to atmospheric pressure. U type manometers which have been found to be particularly suitable for purposes of this invention are the electric contactor U type manometers such as for instance the electric contactor U type manometer model number 20 DC 25 WM, manufactured by the Meriam Instrument Company, of Cleveland, Ohio. Units of this type are equipped with tungsten electrical contacts in both the high pressure leg and the low pressure leg thereby providing a pressure switch suitable for use in a control system.

What is claimed is:

1. Measuring apparatus for determining pickup of a coating composition on a moving substrate comprising: a pad pan, said pad pan having upper and lower probe members to regulate the liquid level in said pad pan, a counter to measure the length of a moving substrate, U-type manometer means, said manometer means having electrically responsive members operably associated with both legs and responsive to the level of liquid in the corresponding leg, an air bubbler tube immersed in a fixed position below the lower of said probe members in said pad pan, said counter being actuated by the electrically responsive means in one of the legs and deactivated by the electrically responsive means in the other leg, means connecting said manometer in pressure measuring relationship with said air bubbler tube whereby said electrically responsive members are sensitized in response to preselected bubbler tube pressure changes, said pressure changes corresponding to the loss of a known quantity of coating composition.

2. Measuring apparatus for determining pickup of a coating composition on a moving substrate comprising: a pad pan, said pad pan having upper and lower probe members to regulate the liquid level in said pad pan, a counter to measure the length of a moving substrate, U-type manometer means, said manometer means having electrically responsive members in both legs and responsive to the level of liquid in the corresponding leg, an air bubbler tube immersed in a fixed position below the lower of said probe members in said pad pan, said counter being actuated by the electrically responsive means in one of the legs and deactivated by the electrically responsive means in the other leg, means connecting said manometer in pressure measuring relationship with said air bubbler tube whereby said electrically responsive members are sensitized in response to preselected bubbler tube pressure changes, said pressure changes corresponding to the loss of a known quantity of coating composition.

3. The structure of claim 2 wherein said counter is an electro magnetic counter.

4. Measuring apparatus for determining pickup of a coating composition on a moving substrate comprising: a pad pan having a liquid level therein, counter means to measure the length of a moving substrate, manometer means operably associated with said pad pan and responsive to a change in liquid level, a first control means operably associated with said pad pan to control the level of liquid in said pad pan, a second control means operably associated with said manometer means to actuate and deactuate said counter means in response to two different measurements of said manometer means and means interconnecting said first and second control means to allow said second control means to actuate said counter means when said first control means indicates the liquid level in said pad pan is at a predetermined level and subsequently to deactivate said counter means when the liquid level is at a second predetermined level.

5. The structure of claim 4 wherein said second control means includes an air bubbler tube.

6. The structure of claim 5 wherein said manometer means is a U-shaped manometer and said second control means is operably associated with both legs of said manometer.

7. The structure of claim 6 wherein said second control means includes a probe member in each of the legs of said manometer.

References Cited

UNITED STATES PATENTS

| | | | |
|---|---|---|---|
| 2,678,434 | 9/1954 | Brown et al. | 73—301 X |
| 3,172,779 | 3/1965 | Warshaw et al. | 118—9 |
| 3,200,971 | 8/1965 | Trethewey | 73—302 X |

LOUIS R. PRINCE, *Primary Examiner.*

DAVID SCHONBERG, *Examiner.*

D. M. YASICH, *Assistant Examiner.*